US012209436B2

(12) United States Patent
Chen

(10) Patent No.: US 12,209,436 B2
(45) Date of Patent: Jan. 28, 2025

(54) CROSS BAR TYPE UNLOCK-DRIVING STRUCTURE

(71) Applicant: Shanghai MingWei Hardware Co., Ltd., Shanghai (CN)

(72) Inventor: Lawrence Chen, Shanghai (CN)

(73) Assignee: SHANGHAI MING WEI HARDWARE CO., LTD., Shanghai (CN)

( * ) Notice: Subject to any disclaimer, the term of this patent is extended or adjusted under 35 U.S.C. 154(b) by 270 days.

(21) Appl. No.: 17/740,641

(22) Filed: May 10, 2022

(65) Prior Publication Data

US 2022/0268060 A1 Aug. 25, 2022

Related U.S. Application Data

(63) Continuation-in-part of application No. 16/738,574, filed on Jan. 9, 2020, now abandoned.

(51) Int. Cl.
*E05B 65/10* (2006.01)
*E05B 63/20* (2006.01)

(52) U.S. Cl.
CPC .......... *E05B 65/1066* (2013.01); *E05B 63/20* (2013.01); *E05B 65/1006* (2013.01); *E05B 65/1046* (2013.01); *E05B 65/1053* (2013.01)

(58) Field of Classification Search
CPC ............. E05B 65/1046; E05B 65/1053; E05B 65/106; E05B 65/1066; E05B 65/1073; E05B 65/087; E05B 65/1013; E05B 63/20; Y10T 292/0908; Y10T 70/5159; Y10T 292/0822; Y10T 292/57; Y10T 292/0839; Y10T 292/1078
See application file for complete search history.

(56) References Cited

U.S. PATENT DOCUMENTS

| | | | | |
|---|---|---|---|---|
| 1,345,041 A | | 6/1920 | Voight | |
| 1,518,187 A | | 12/1924 | Dyer | |
| 1,539,350 A | * | 5/1925 | Clark | E05B 65/1066 70/92 |
| 1,585,167 A | | 5/1926 | Palmer | |
| 1,598,116 A | | 8/1926 | Bolles | |
| 1,674,760 A | | 6/1928 | Carroll | |
| 1,677,271 A | | 7/1928 | Carroll | |

(Continued)

*Primary Examiner* — Christine M Mills
*Assistant Examiner* — Faria F Ahmad
(74) *Attorney, Agent, or Firm* — Muncy, Geissler, Olds & Lowe, P.C.

(57) ABSTRACT

A cross bar type unlock-driving structure, to be mounted in a panel-outside space of a door panel, includes a handle-end frame, a mounting frame, a handle and a driving member, and a handle seat. The handle-end base includes a basic frame and a mounting frame to form an accommodation space with both vertical and horizontal opening. The handle and the driving member, integrated as a unique piece, provide the driving member to be formed as an extension finger for pushing an unlock-driven unit disposed inside the accommodation space. The handle seat, mounted onto the middle plate of the mounting frame, is to mount pivotally the handle and the driving member with the driving member located in the accommodation space and the handle located out of the handle seat. With the vertical and horizontal opening provided to the accommodation space, different types of lock cartridges can be contained.

3 Claims, 16 Drawing Sheets

(56) References Cited

U.S. PATENT DOCUMENTS

| | | | | |
|---|---|---|---|---|
| 1,708,078 | A | | 4/1929 | Bolles |
| 1,844,767 | A | | 2/1932 | Kelly |
| 1,867,606 | A | | 7/1932 | Van Sickles |
| 2,029,901 | A | | 2/1936 | Voight |
| 2,056,537 | A | | 10/1936 | Schatzlein |
| 2,098,776 | A | | 11/1937 | Edwards |
| 2,198,359 | A | | 4/1940 | Voight et al. |
| 2,202,075 | A | | 5/1940 | Yoe |
| 2,505,190 | A | | 4/1950 | Kulbersh |
| 2,719,048 | A | | 9/1955 | Hayes |
| 2,752,773 | A | | 7/1956 | Arthur et al. |
| 3,073,142 | A | | 1/1963 | Stebbins |
| 3,266,829 | A | | 8/1966 | Gasser et al. |
| 3,271,982 | A | | 9/1966 | Welch |
| 3,324,692 | A | | 6/1967 | Welch |
| 3,345,099 | A | | 10/1967 | Paul et al. |
| 3,383,130 | A | | 5/1968 | De Avila |
| 3,477,260 | A | | 11/1969 | Balducci et al. |
| 3,563,585 | A | | 2/1971 | Welch |
| 3,600,022 | A | | 8/1971 | Armstrong |
| 3,645,572 | A | | 2/1972 | McFarlane |
| 3,696,648 | A | | 10/1972 | Horgan, Jr. |
| 3,703,741 | A | | 11/1972 | Foster et al. |
| 3,765,198 | A | | 10/1973 | Horgan |
| 3,819,213 | A | | 6/1974 | Vanderburgh |
| 3,981,164 | A | | 9/1976 | Balducci |
| 3,993,335 | A | | 11/1976 | Schmidt |
| 4,007,954 | A | * | 2/1977 | Erickson ................ A62C 2/242 49/7 |
| 4,145,900 | A | | 3/1979 | Ohno |
| 4,311,329 | A | | 1/1982 | Kral |
| 4,498,319 | A | | 2/1985 | Balducci et al. |
| 4,601,499 | A | | 7/1986 | Kim |
| 4,714,282 | A | | 12/1987 | Henderson |
| 4,986,583 | A | * | 1/1991 | Campbell ............. E05B 65/104 292/336.3 |
| 5,114,192 | A | | 5/1992 | Toledo et al. |
| 5,865,483 | A | | 2/1999 | Dubravin |
| 6,953,211 | B2 | | 10/2005 | di Vinadio |
| 7,896,407 | B2 | | 3/2011 | di Vinadio |
| 8,424,928 | B2 | * | 4/2013 | Lin ......................... E05B 53/00 70/92 |
| 8,616,591 | B2 | | 12/2013 | Parker |
| 10,415,271 | B2 | | 9/2019 | Graham |
| 10,597,910 | B2 | * | 3/2020 | Chen ....................... E05B 85/02 |
| 10,662,671 | B2 | | 5/2020 | Stallbaumer |
| 2013/0076046 | A1 | * | 3/2013 | Shah ..................... E05B 1/0053 292/336.3 |
| 2014/0246872 | A1 | * | 9/2014 | Shen ......................... E05B 7/00 292/336.3 |
| 2019/0374864 | A1 | | 12/2019 | Cragle |
| 2020/0240179 | A1 | | 7/2020 | Grewe et al. |

* cited by examiner

CROSS BAR TYPE UNLOCK-DRIVING STRUCTURE

This application claims the benefit of Taiwan Patent Application Serial No. 108214988, filed on Nov. 12, 2019. This application is a continuation-in-part of U.S. patent application Ser. No. 16/738,574 filed Jan. 9, 2020. Both of the above applications are incorporated by reference herein.

BACKGROUND OF THE INVENTION

(1) Field of the Invention

The invention relates to a lock structure, and more particularly to a cross bar type unlock-driving structure.

(2) Description of the Prior Art

Generally speaking, a building is typically furnished with several fire doors. While in meeting a fire, people can unlock the nearby fire door, and escape therefrom. Currently, locks for the fire door can be classified, according to the installation pattern, into single-point locks, double-point locks, three-point locks, vertical single-point locks, embedded lock cartridges and embedded vertical double-point lock-driving structures. In particular, the embedded lock cartridge is mounted inside the fire door, and, according to different protrusion types of bolts, further classified into a horizontal type or a rotational type. In addition, the embedded vertical double-point lock-driving structure is also mounted inside the fire door, but is furnished with a lock bar moving vertically. On the other hand, the single-point lock, the double-point lock, the three-point lock and the vertical single-point lock are all mounted exterior to the fire door.

Nevertheless, respective to different lock cartridges or locks, different unlock-driving structures shall be utilized to control the corresponding lock cartridges or locks. Refer now to FIG. 1 and FIG. 2; where FIG. 1 is a schematic view of a conventional unlock-driving structure installed at a fire door, and FIG. 2 shows schematically another conventional unlock-driving structure installed at the fire door. As shown, different unlock-driving structures PA1 and PA1*a* are mounted to the corresponding fire doors PA2.

In FIG. 1, the unlock-driving structure PA1 includes a handle assembly PA11 and a handle-end base PA12. The handle-end base PA12 is furnished for a bolt PA3 of the single-point lock to mount in a penetration manner. As the handle assembly PA11 is depressed down, the bolt PA3 would be driven horizontally so as to unlock and thus open the fire door PA2. In FIG. 2, the unlock-driving structure PA1*a* includes a handle assembly PA11 and a handle-end base PA12*a*. The handle-end base PA12*a* is furnished for a lock bar PA3*a* of the double-point lock to mount in a vertical penetration manner. As the handle assembly PA11 is depressed down, the lock bar PA3*a* would be driven to move vertically so as to unlock and thus open the fire door PA2.

However, either the unlock-driving structure PA1 or the unlock-driving structure PA1*a* is structurally unique. Namely, as shown, the unlock-driving structure PA1*a* cannot apply the bolt PA3 that should be horizontally mounted, while the unlock-driving structure PA1 cannot apply the lock bar PA3*a* that should be vertically mounted. In other words, different locks should be paired by specific unlock-driving structures, and thereby the relative manufacturing cost would be expensive. Further, replacement and maintenance of these conventional locks and lock cartridges are extremely tedious, and thus development for an improvement of the unlock-driving structure is definitely needed.

SUMMARY OF THE INVENTION

In view that different conventional locks should be paired by specific unlock-driving structures, thus problems in expensive manufacturing cost and tedious replacement process would be inevitable. Accordingly, it is an object of the present invention to provide a cross bar type unlock-driving structure that can be useful for resolving at least one of the aforesaid two problems.

In this disclosure, a cross bar type unlock-driving structure, is applied be mounted in a panel-outside space of a door panel, capable of generally applying to either one of a single-point lock, a double-point lock, a three-point lock, a vertical single-point lock, an embedded lock cartridge and an embedded vertical double-point lock-driving structure. The cross bar type unlock-driving structure includes a handle-end frame, a mounting frame, a handle and a driving member, and a handle seat.

The handle-end base, disposed in the panel-outside space of the door panel, includes a basic frame and a mounting frame. The basic frame, mounted on the door panel, is furnished at a lower portion thereof with a through hole. The mounting frame, disposed in front of the basic frame by opposing the door panel to engage the basic frame for forming thereinside an accommodation space, has two vertical lateral plates to stand in parallel on the basic frame and a middle plate connecting the two vertical lateral plates. Each of the two vertical lateral plates is structured to have a middle horizontal opening. The mounting frame is furnished at a middle portion thereof with a base through hole. As the basic frame and the mounting plate are engaged to define the accommodation space, the accommodation space is opened vertically to an upper space and a lower space and also communicated spatially with lateral spaces through the horizontal openings of the corresponding vertical lateral plates.

The handle and the driving member are integrated as a one-piece member. The driving member is formed as an extension finger connected to one end of the handle and connected fixedly with the cross bar type handle assembly. In addition, the driving member is to contact a driven unit of either one of the single-point lock, the double-point lock, the three-point lock, the vertical single-point lock, the embedded lock cartridge and the embedded vertical double-point lock-driving structure in the accommodation space.

The handle seat, mounted onto the middle plate of the mounting frame by opposing the basic frame, has thereon an installation hole at a position in correspondence to the base through hole to mount the pivotally the handle and the driving member with the driving member located in the accommodation space and the handle located out of the handle seat.

In one embodiment of the present invention, the mounting frame is a symmetric frame.

In one embodiment of the present invention, a connection corner is formed between the driving member and the handle for allowing a pivotal engagement with the handle seat.

As stated above, the cross bar type unlock-driving structure of this invention provides an accommodation space with vertical and horizontal opening to contain different types of lock cartridges. Thereupon, manufacturing cost can be significantly reduced. In addition, while a replacement or maintenance of the lock is needed, the replacement process and complexity would be remarkably reduced due to the generality provided by the cross bar type unlock-driving structure of this invention.

All these objects are achieved by the cross bar type unlock-driving structure described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a cross bar type unlock-driving structure. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
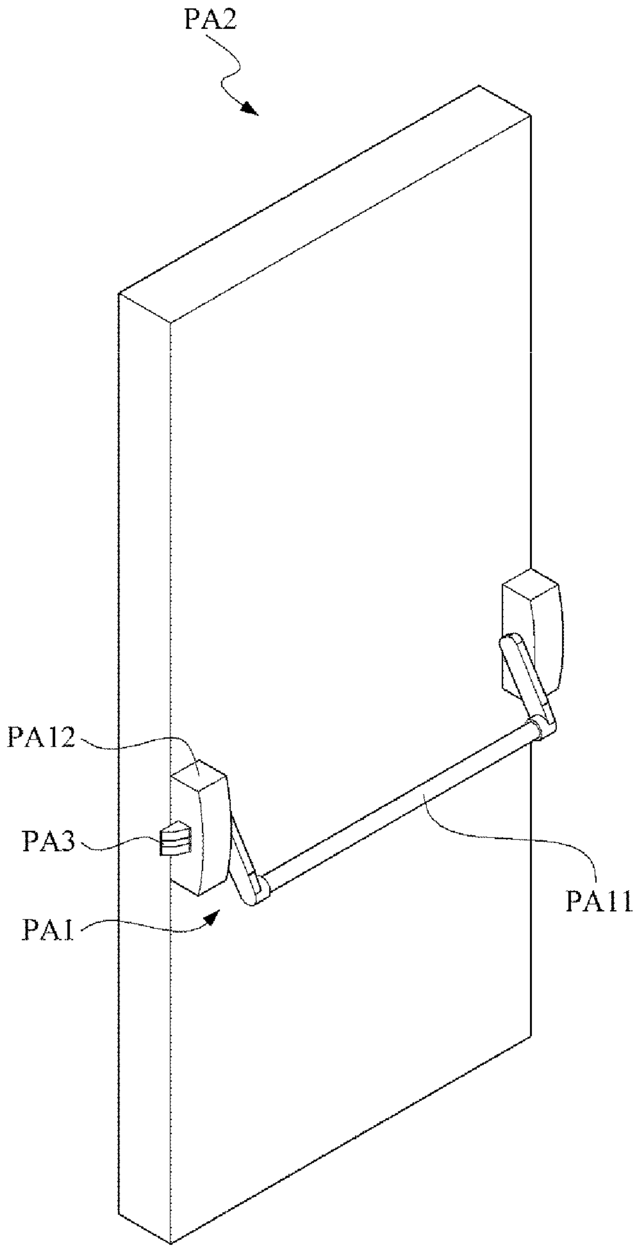
FIG.1(Prior Art)
FIG. 1 is a schematic view of a conventional unlock-driving structure installed at a fire door.
Figure 2:
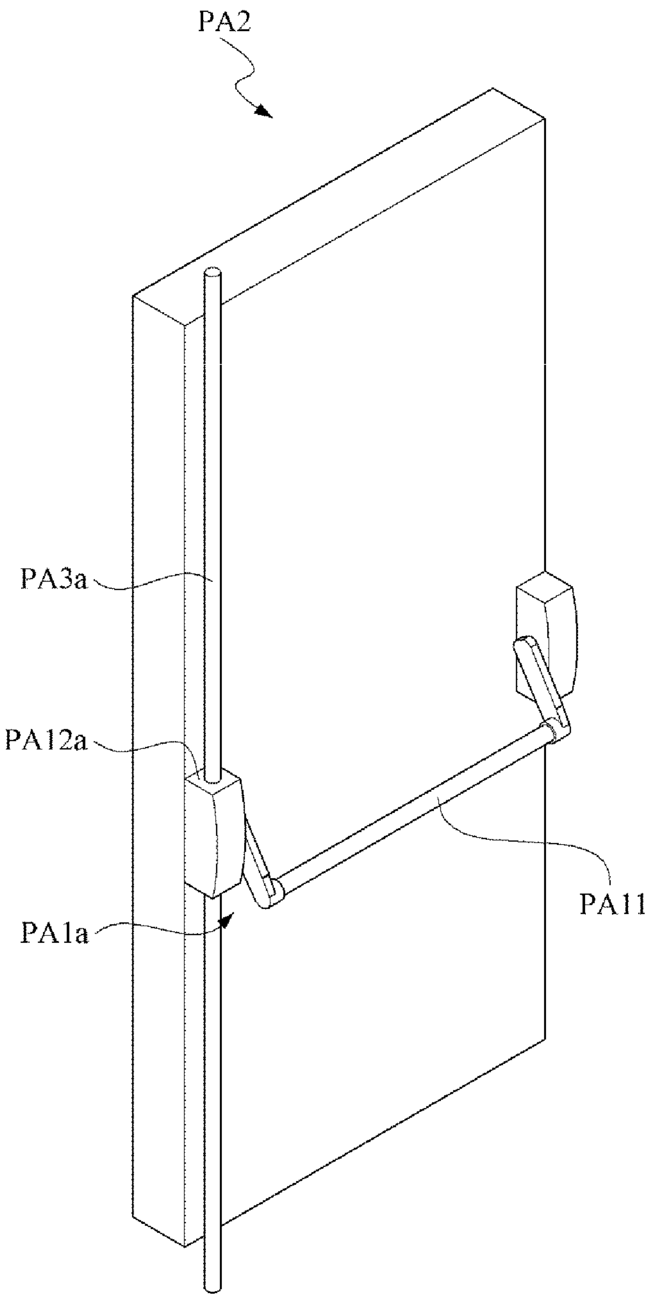
FIG.2(Prior Art)
FIG. 2 is a schematic views of another conventional unlock-driving structure installed at the fire door.
Figure 3:
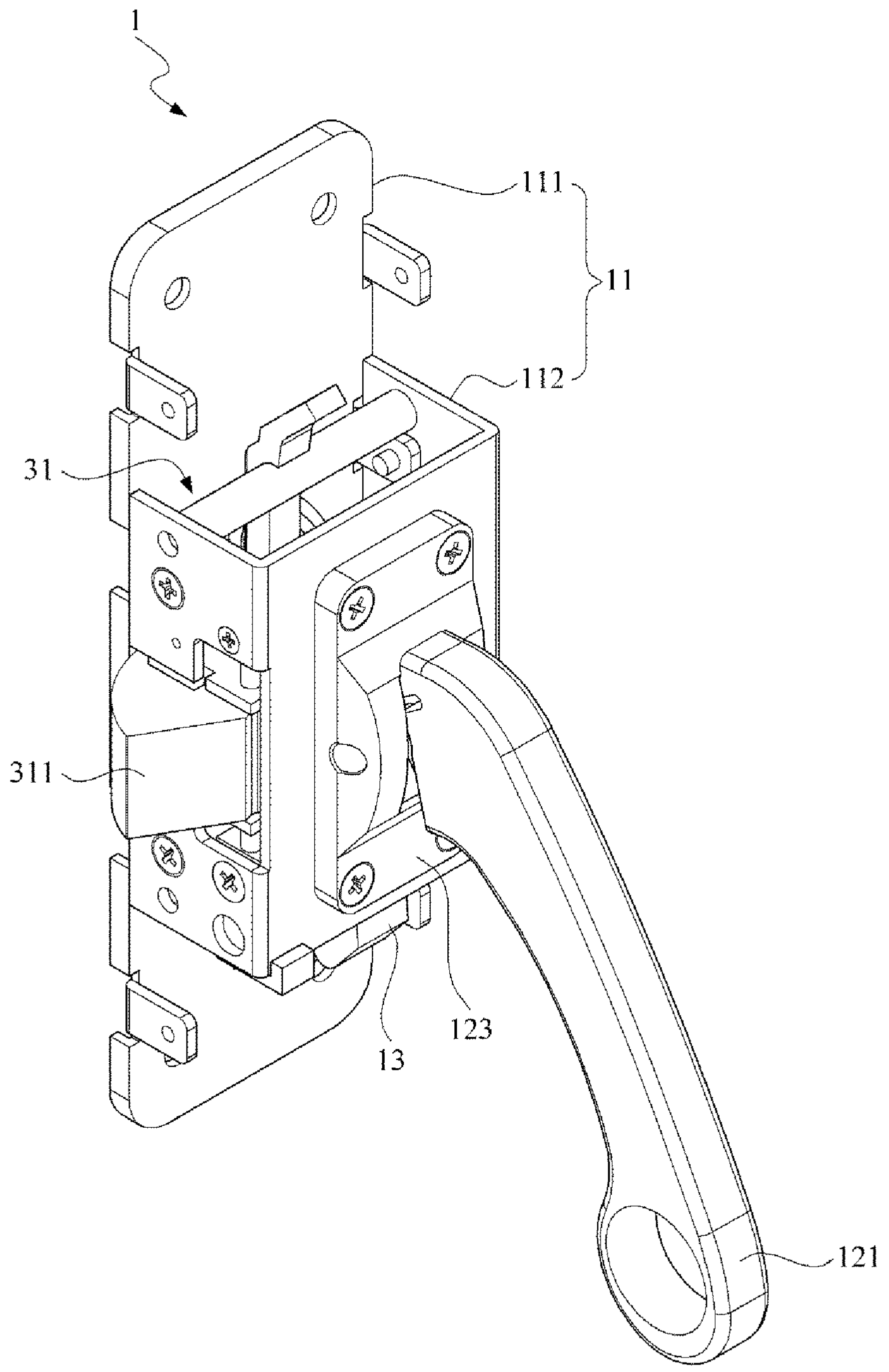
FIG. 3 is a schematic perspective view of a preferred embodiment of the cross bar type unlock-driving structure in accordance with the present invention applied to a single-point lock.
Figure 4:
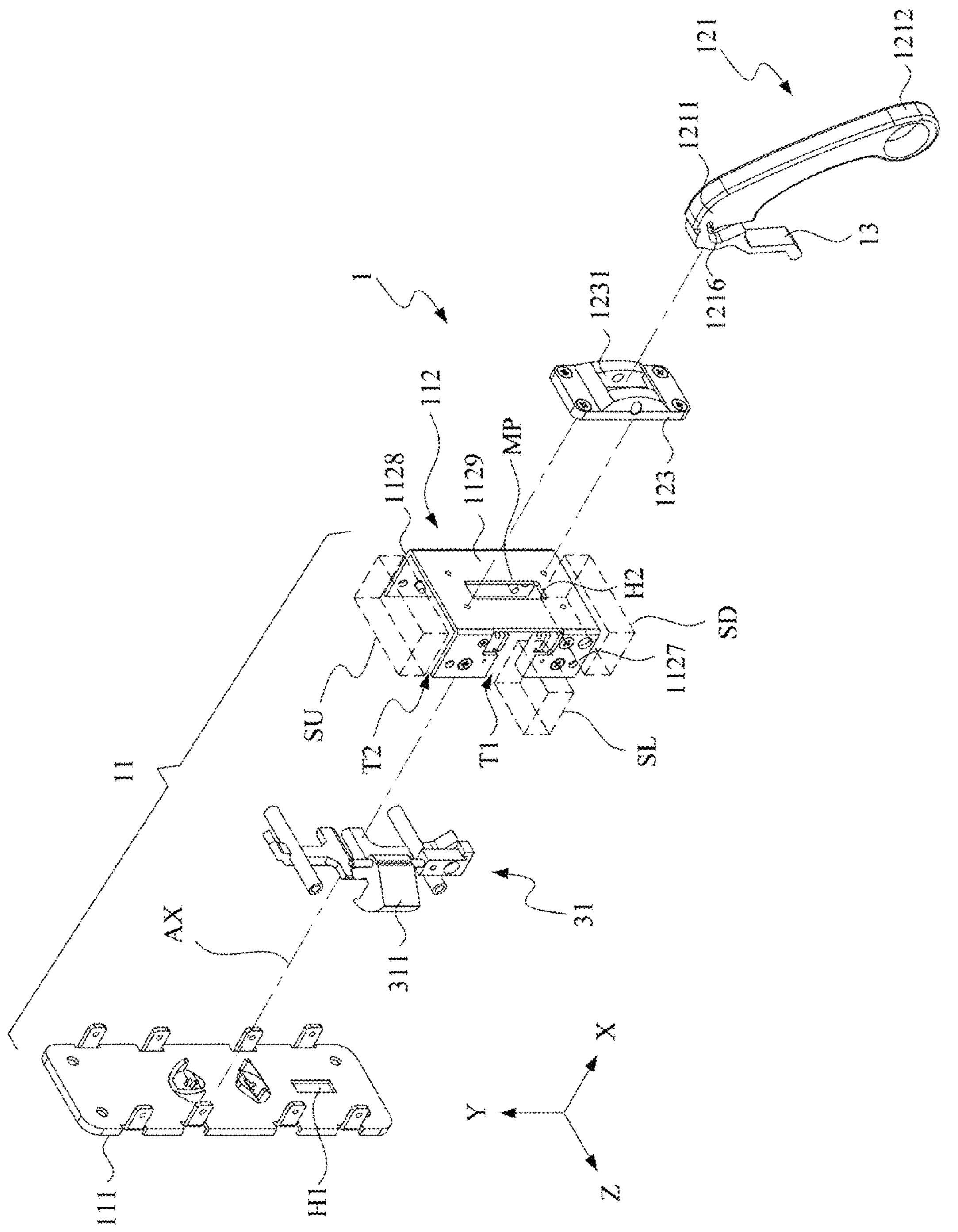
FIG. 4 is a schematic exploded view of FIG. 3.
Figure 5:
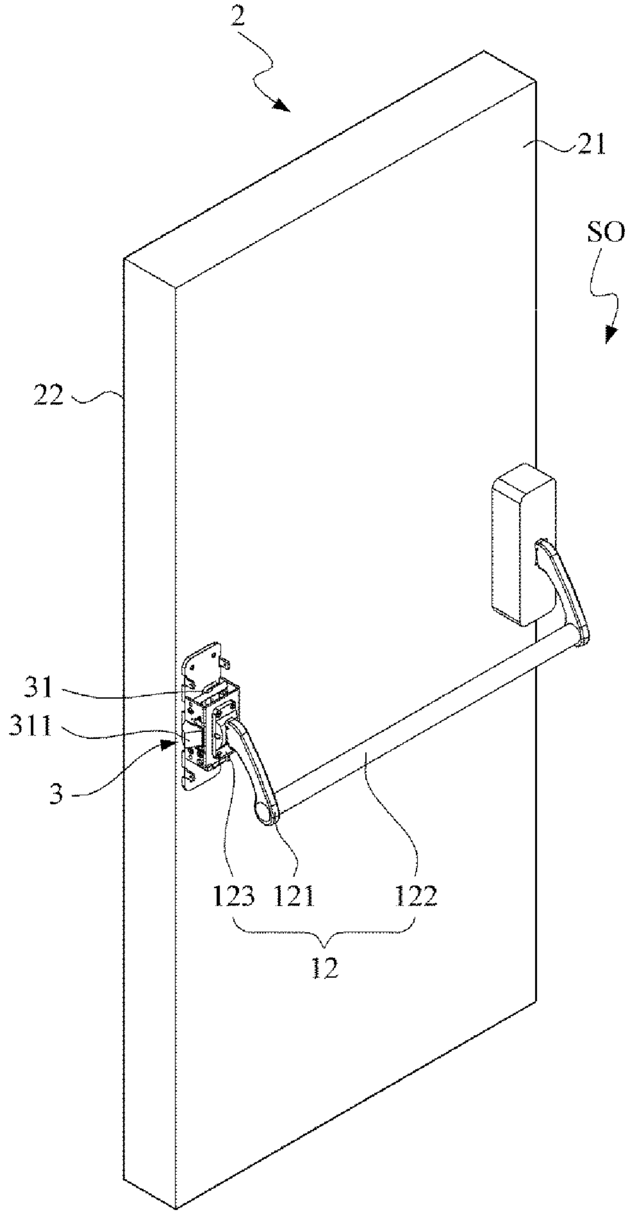
FIG. 5 demonstrates schematically the cross bar type unlock-driving structure of FIG. 3 being applied to the single-point lock mounted on a door panel.

Refer now to FIG. 3 through FIG. 5; where FIG. 3 is a schematic perspective view of a preferred embodiment of the cross bar type unlock-driving structure in accordance with the present invention applied to a single-point lock, FIG. 4 is a schematic exploded view of FIG. 3, and FIG. 5 demonstrates schematically the cross bar type unlock-driving structure of FIG. 3 being applied to the single-point lock mounted on a door panel. As shown, the cross bar type unlock-driving structure 1 is furnished to a single-point lock 3 in a panel-outside space SO of a door panel 2, in which the door panel 2 of this embodiment can be a fire door.

The door panel 2 includes a first door plate 21 and a second door plate 22 opposing the first door plate 21. Between the first door plate 21 and the second door plate 22, a panel-inside space SI (labeled in FIG. 15) is defined. The panel-outside space SO is the space other than the panel-inside space SI. The single-point lock 3 includes at least a driven unit 31, and the driven unit 31 further includes at least a bolt 311 to move horizontally.

The cross bar type unlock-driving structure 1 includes a handle-end base 11, a cross bar type handle assembly 12 and a driving member 13.

The handle-end base 11, as a two-piece assembly, includes a plate-type basic frame 111 and a mounting frame 112 (preferably being a bracket-type mounting frame). Preferably, the plate-type basic frame 111 and the mounting frame 112 are both symmetric components with respect to a central axis AX, as shown in FIG. 4. The basic frame 111, mounted onto the door panel 2 (an Y-Z plane), is furnished at a lower portion thereof with a through hole H1. The mounting frame 112, disposed at a front side of the basic frame 111 by opposing the door panel 2 so as to form an accommodation space T2 in between with the basic frame 111, has two vertical lateral plates 1127, 1128 to be fixed on to the basic frame 111 and a middle plate 1129 connecting the two vertical lateral plates 1127 and 1128. Preferably, the two vertical lateral plates 1127 and 1128 are symmetry and parallel to each other. With the mounting frame 112 to engage the basic frame 111, the accommodation space T2 is formed by being opened vertically in the Y direction. Each of the two vertical lateral plates 1127, 1128, or at least one vertical lateral plate 1127 (for example), is structured to have a middle horizontal opening T1 extending in the X direction. On the other hand, the mounting frame 112 is furnished at a middle portion MP thereof with a base through hole H2. In this embodiment, after the basic frame 111 and the bracket-type mounting plate 112 are engaged to define the internal accommodation space T2 opened vertically to both an upper space SU and a lower space SD (in the Y direction) and also communicated spatially with the lateral space(s) SL through the horizontal opening(s) T1.

The cross bar type handle assembly 12 includes a handle 121, a connection bar 122 and a handle seat 123. The handle 121, to be disposed pivotally with respect to the handle-end base 11 about the Z direction, is connected with the driving member 13. Preferably, in this embodiment, the handle 121 and the driving member 13 are integrated as a one-piece member. As shown in FIG. 4, the driving member 13 is formed as an extension finger connected to one end 1211 of the handle 121, while another end 1212 thereof is structured to connect the connection bar 122. The connection bar 122, connected with the handle 121, is used for a user to press down the handle 121. The handle seat 123, mounted onto the middle plate 1129 of the mounting frame 112 by opposing the basic frame 111, has thereon an installation hole 1231 at a position in correspondence to the base through hole H2 and used for the handle 121 to protrude the driving member 13 therethrough (also passing through the base through hole H2) into the accommodation space T2. In addition, the handle 121 ad well as the driving member 13 are pivotally connected on the handle seat 123 through a connection corner 1216 formed between the driving member 13 and the handle 121. Thereupon, the assembly of the handle 121 and the driving member 13 can be pivoted above the handle seat 123 as well as the bracket-type mounting plate 112 on a Y-Z plane, with the driving member 13 in the accommodation space T2 and the handle out of the handle-end base 11.

The driving member 13 is fixedly connected with the handle 121. Though, in this embodiment, the driving member 13 is integrated as a unique piece with the handle 121, yet, in some other embodiments of this disclosure not shown herein, the driving member 13 can be fixed to the handle 121 by a fastener, a buckling element, a glue, a solder or the like fixation means. In this disclosure, the driving member 13 and the handle 121 are fixedly connected as a solid part that is moved like a rigid body. The driving member 13 has a driving stroke D1 (labeled in FIG. 8) on the Y-Z plane inside the accommodation space T2, and is synchronously moved with the cross bar type handle assembly 12. In this invention, the finger-shape driving member 13 is driven by the handle 121 to undergo the driving stroke D1 lying on the X-Y plane contains the central axis AX. The unlocking action upon the driven unit 31 of this invention is basically performed by an exterior surface of the driving member 13, through which a driving trajectory to unlock the driven unit 31 is thus provided.

The driven unit 31, located in the accommodation space T2, is driven by the driving member 13, precisely pushed by the exterior surface of the driving member 13. As the connection bar 122 is depressed down, the handle 121 would move downward in a pivotal manner as well with respect to the handle seat 123, such that the driving member 13 would swing along the driving stroke D1 inside the accommodation space T2. With the driving member 13 to move along the driving stroke D1, the driven unit 31 would be pushed to displace the bolt 311 along a bolting stroke D3 (labeled in FIG. 10) on an X-Z plane perpendicular to the X-Y plane lying the driving stroke D1 to perform unlocking. Thereupon, the door panel 2 can be pushed to open.

While the cross bar type unlock-driving structure 1 is assembled to the single-point lock 3, a part of the driven unit 31 would be driven by the driving member 13 within the accommodation space T2, while another part thereof (the bolt 311) would move synchronously horizontally within the horizontal opening T1 of either one of the vertical lateral plates 1127 and 1128.

Figure 6:
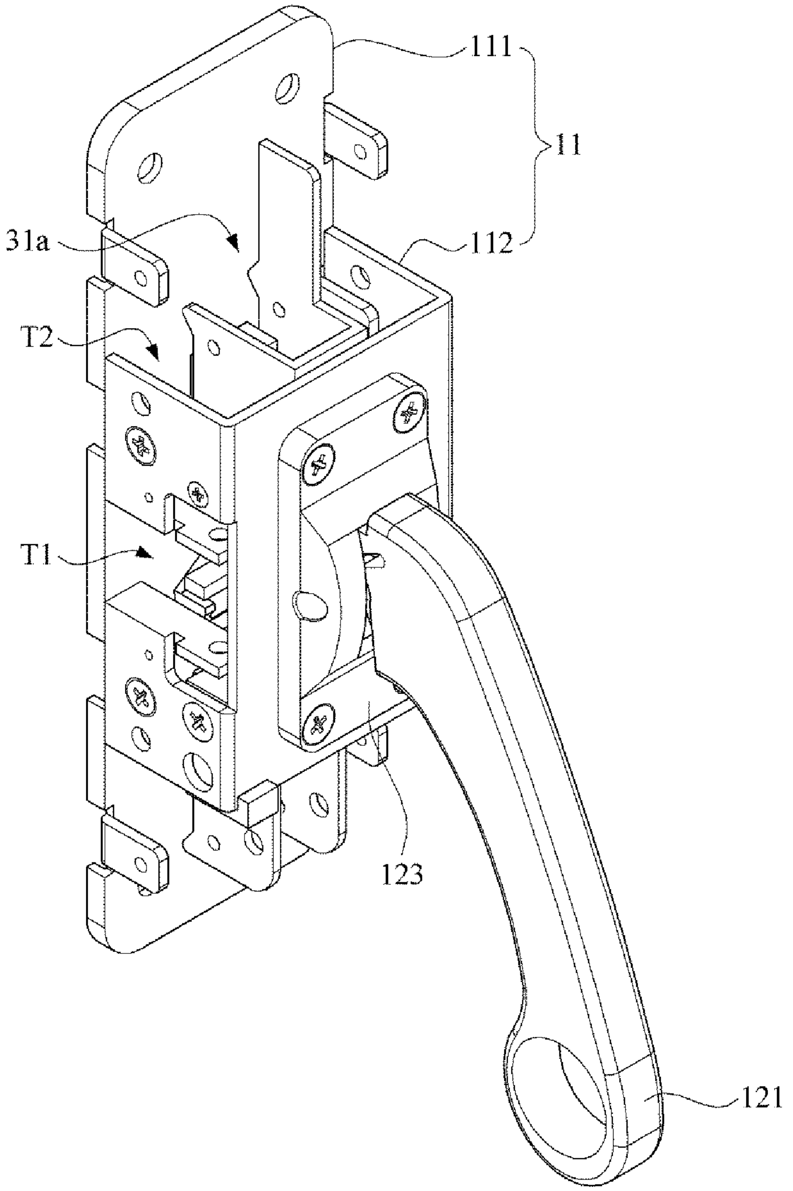
FIG. 6 is a schematic perspective view of the preferred embodiment of the cross bar type unlock-driving structure in accordance with the present invention applied to a double-point lock.
Figure 7:
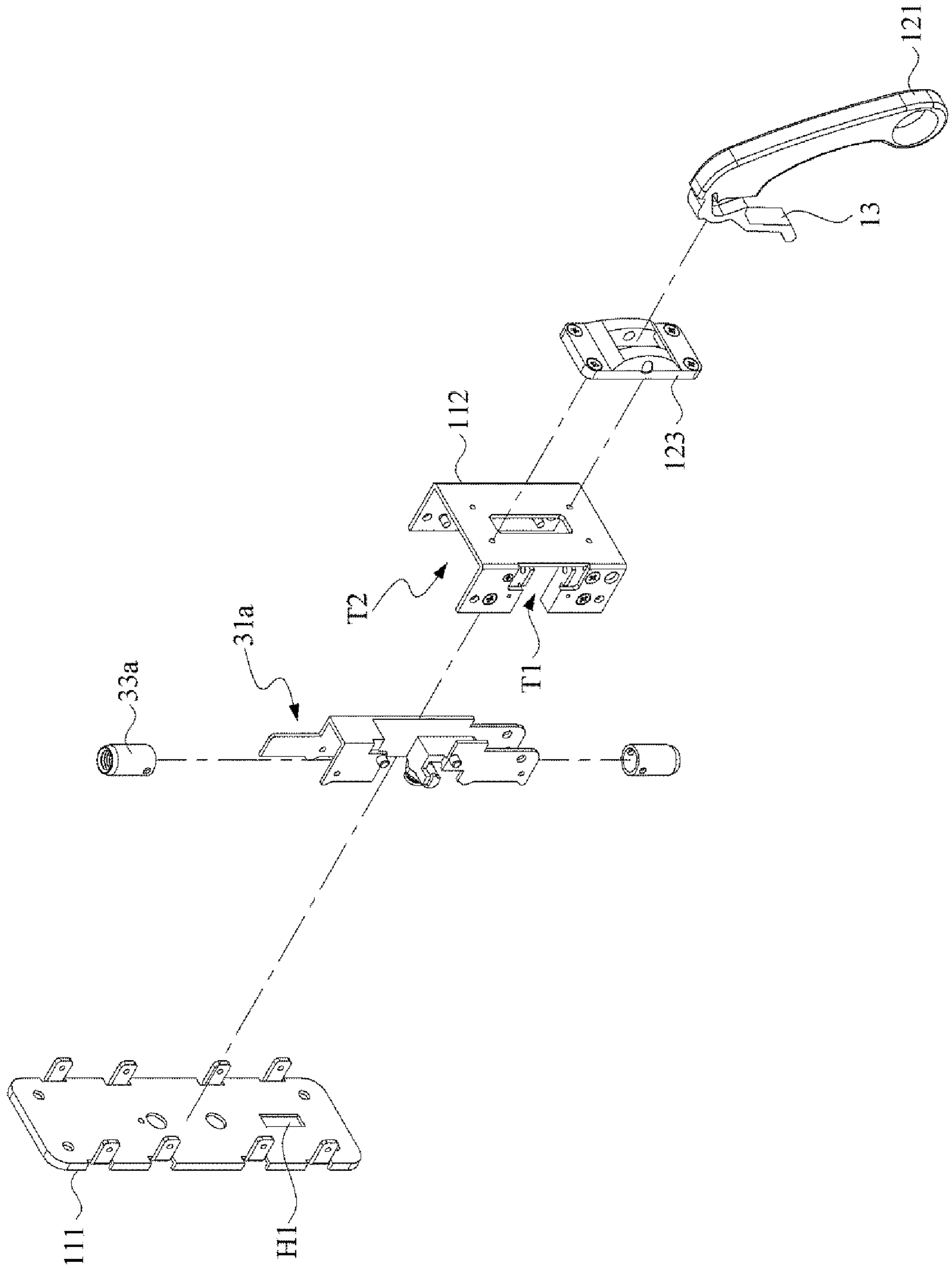
FIG. 7 is a schematic exploded view of FIG. 6.
Figure 8:
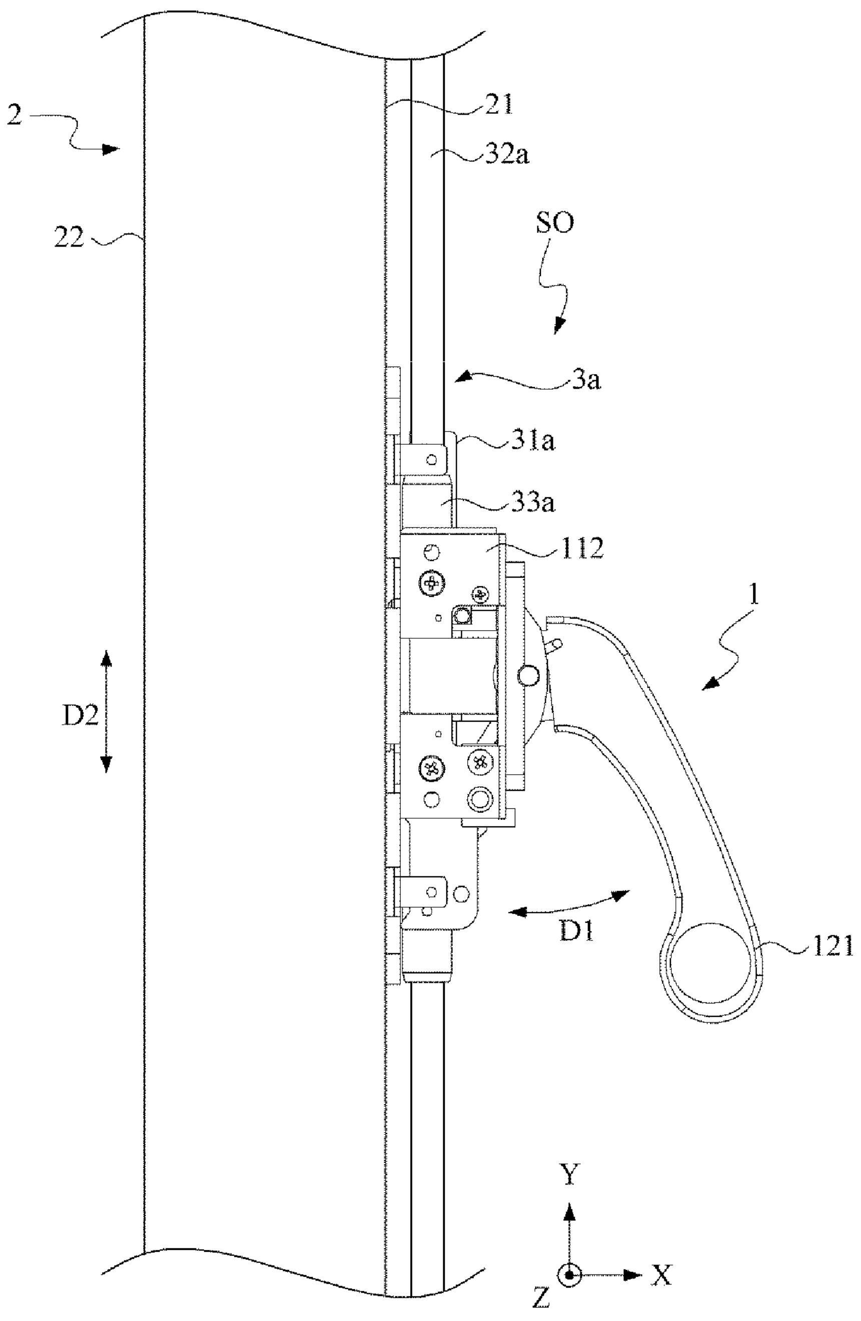
FIG. 8 demonstrates schematically the cross bar type unlock-driving structure of FIG. 6 being applied to the double-point lock mounted on a door panel.

Then, refer now to FIG. 6 through FIG. 8; where FIG. 6 is a schematic perspective view of the preferred embodiment of the cross bar type unlock-driving structure in accordance with the present invention applied to a double-point lock, FIG. 7 is a schematic exploded view of FIG. 6, and FIG. 8 demonstrates schematically the cross bar type unlock-driving structure of FIG. 6 being applied to the double-point lock mounted on a door panel. As shown, the cross bar type unlock-driving structure 1 is furnished to a double-point lock 3*a*, and the double-point lock 3*a* is mounted in the panel-outside space SO of the door panel 2. In particular, the door panel 2 can be a typical fire door.

The double-point lock 3*a* includes at least a driven unit 31*a* and a lock bar 32*a*, in which a part of the driven unit 31*a* is located within the accommodation space T2 to follow the driving stroke D1. Also, in this embodiment, the double-point lock 3*a* further includes an assembled connector 33*a* for connecting the driven unit 31*a* and the lock bar 32*a*.

When the connection bar 122 is pressed down, the handle 121 would move downward as well. Thereupon, the driving member 13 would move simultaneously along the driving stroke D1 to displace the driven unit 31*a*. The driven unit 31*a* would then drive the lock bar 32*a* to move along a vertical stroke D2 via the assembled connector 33*a*. On the other hand, as the connection bar 122 is pressed down, the lock bar 32*a* would be moved upward to put the double-point lock 3*a* into an unlock state, and then the door panel 2 can be pushed to open. As long as the depression upon the connection bar 122 is removed, it will resume its original position. At this time, the lock bar 32*a* would move downward automatically due to its own gravity. Thereby, the double-point lock 3*a* would be back to the lock state, and the door panel 2 is locked in position.

In addition, it is understood that the vertical single-point lock and the double-point lock 3*a* are largely resembled to each other. The only difference in between is that the vertical single-point lock owns the upper lock bar 32*a* of the double-point lock 3*a* but waives the lower lock bar 32*a*. Thus, in comparison with the double-point lock 3*a*, the vertical single-point lock would have only one lock point (i.e., the upper lock point). Nevertheless, to both the vertical single-point lock and the double-point lock 3*a*, the assembling and operation of the cross bar type unlock-driving structure 1 are the same, and thus detail thereabout would be omitted herein.

Figure 9:
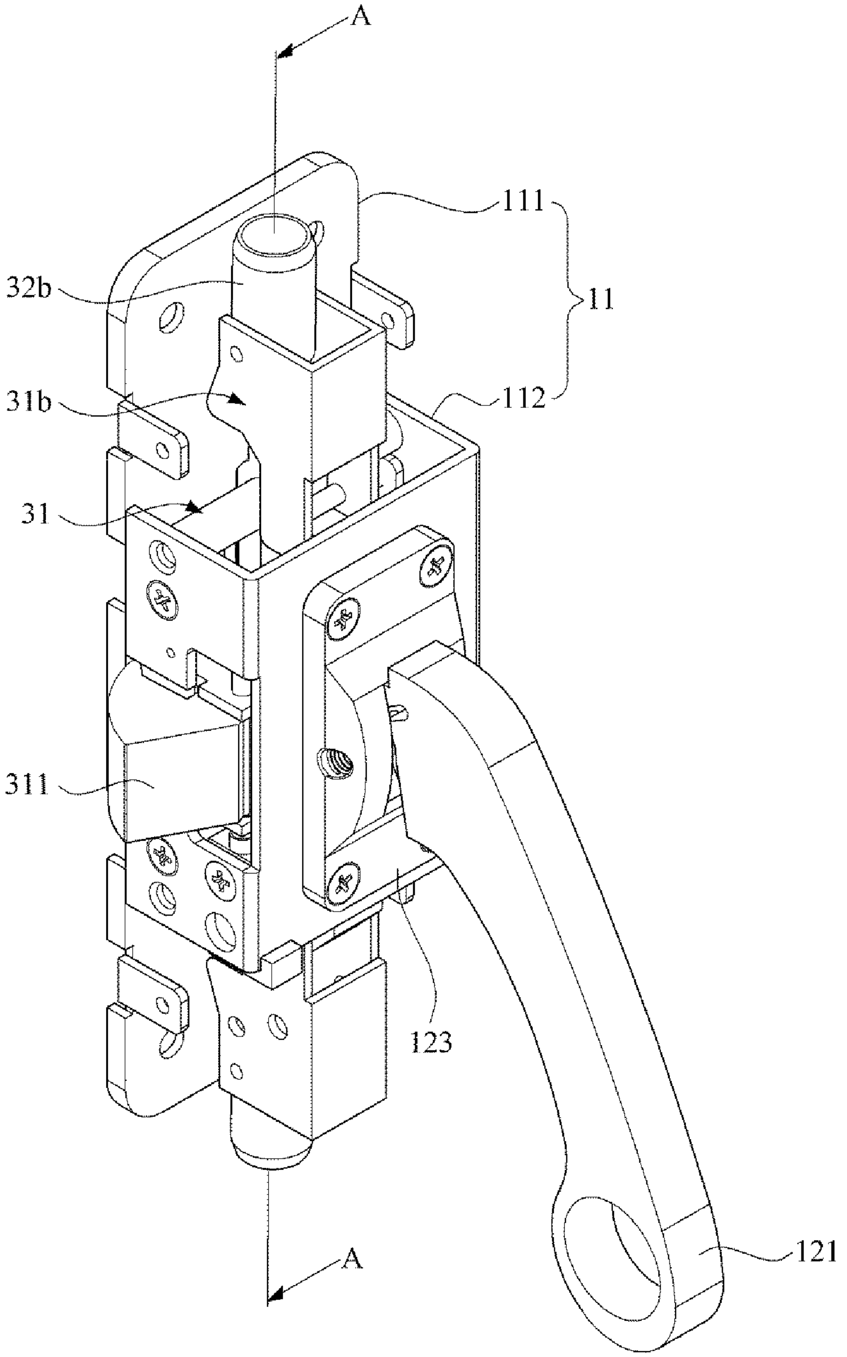
FIG. 9 is a schematic perspective view of the preferred embodiment of the cross bar type unlock-driving structure in accordance with the present invention applied to a three-point lock.
Figure 9A:
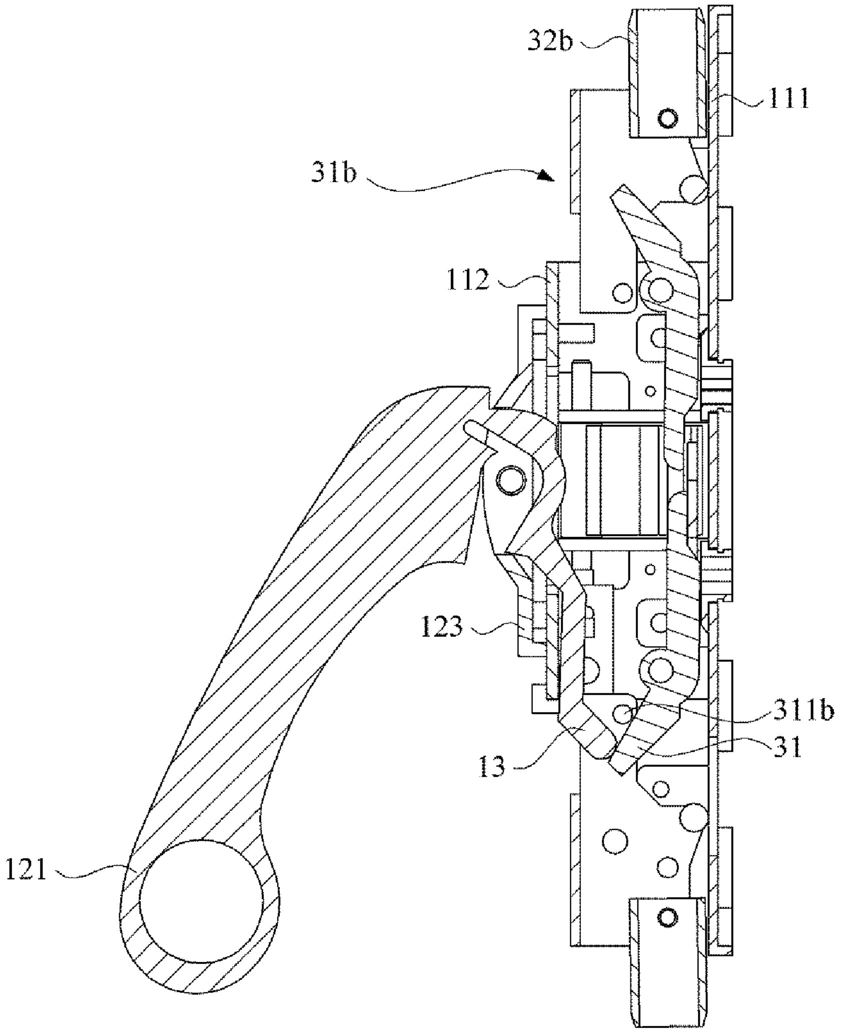
FIG. 9A is a schematic cross-sectional view of FIG. 9 along line A-A.
Figure 10:
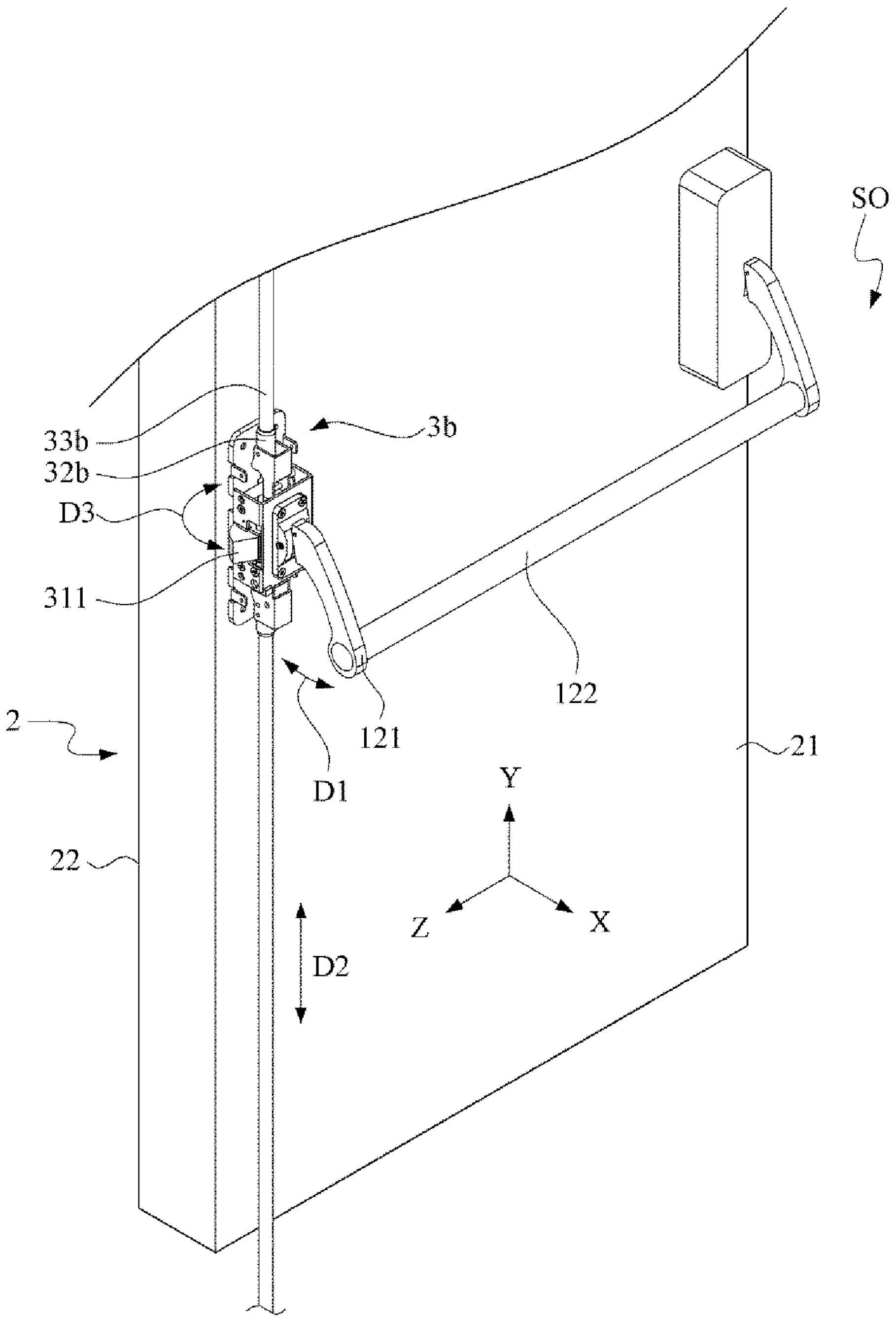
FIG. 10 demonstrates schematically the cross bar type unlock-driving structure of FIG. 9 being applied to the three-point lock mounted on a door panel.

Then, refer to FIG. 9 through FIG. 10; where FIG. 9 is a schematic perspective view of the preferred embodiment of the cross bar type unlock-driving structure in accordance with the present invention applied to a three-point lock, FIG. 9A is a schematic cross-sectional view of FIG. 9 along line A-A, and FIG. 10 demonstrates schematically the cross bar type unlock-driving structure of FIG. 9 being applied to the three-point lock mounted on a door panel. As shown, the cross bar type unlock-driving structure 1 is provided to a three-point lock 3*b* mounted in the panel-outside space SO of the door panel 2, in which the door panel 2 can be a typical fire door.

The three-point lock 3*b* includes at least the aforesaid driven unit 31, a driven unit 31*b*, an assembled connector 32*b* and a lock bar 33*b*. The driven unit 31 includes at least the aforesaid bolt 311 defined with a bolting stroke D3. The lock bar 33*b* is defined with the vertical stroke D2. The assembled connector 32*b* connects the driven unit 31*b* and the lock bar 33*b*.

A part of the driven unit 31 and a part of the driven unit 31*b* are moved along the driving stroke D1 within the accommodation space T2 (labeled in FIG. 4). However, it shall be explained that the driven unit 31 and the driven unit 31*b* would not interfere structurally with each other. In addition, a part of the bolt 311 would move within the horizontal opening T1 (labeled in FIG. 4).

When the connection bar 122 is pressed down, the handle 121 would move downward as well. Thereupon, the driving member 13 would move simultaneously along the driving stroke D1 to displace the driven unit 31. The driven unit 31 would then displace the bolt 311 along the bolting stroke D3. In addition, as the driving member 13 moves along the driving stroke D1, the driven unit 31*b* would be moved simultaneously. The driven unit 31*b* would then drive the lock bar 33*b* to move along the vertical stroke D2 via the assembled connector 32*b*. Namely, as the connection bar 122 is pressed down, the driving member 13 would move along driving stroke D1 to drive simultaneously both the driven unit 31 and the driven unit 31*b*. The driven unit 31 would drive the bolt 311 to retrieve inward along the bolting stroke D3, and the driven unit 31*b* would drive the lock bar 33*b* to move upward along the vertical stroke D2. Thereupon, the three-point lock 3*b* would be in the unlock state, and thus the door panel 2 can be pushed to open.

In this embodiment, the driving member 13 is to push a pin 311*b* of the driven unit 31*b*, and the driven unit 31*b* is moved with the pin 311*b*. In some other embodiments of this disclosure not shown here, the pin 311*b* can be substituted by other element such as a fastener, a roller or any other component that can be used to move with the driven unit 31*b*.

As the depression upon the connection bar 122 is removed, it will gradually get back to its original position. At this time, the lock bar 33*b* would move downward along the vertical stroke D2 by its own gravity. Also, since the driving force upon the driven unit 31 is removed, the bolt 311 would protrude outward along the bolting stroke D3. therefore, the three-point lock 3*b* will resume its lock state, and the door panel 2 can't be pushed to open.

In this embodiment, since the operation of the bolt 311 is the same as that in FIG. 3, FIG. 4 or FIG. 5, thus the same number "311" is assigned. Except for the appearances, the operation of the lock bar 32*b* is the same as that of any of the lock bars 32 of FIG. 6 to FIG. 8. In comparison with the single-point lock 3, the double-point lock 3*a* and the vertical single-point lock, the three-point lock 3*b* has more lock points, so that, while the three-point lock 3*b* is in the lock state, difficulty in opening the door panel 2 is higher. In addition, also since the three-point lock 3*b* has more lock points, so it can still work even whenever any of the lock points (the bolt 311 or the lock bar 33*b*) is ineffective.

Figure 11:
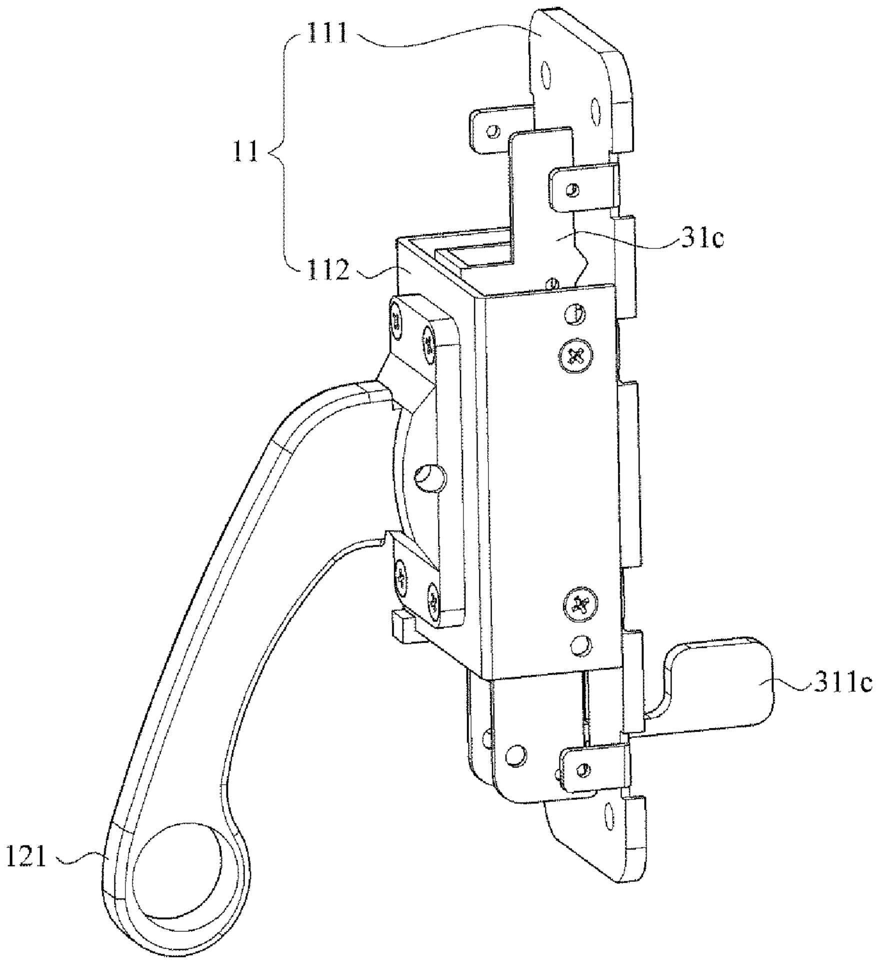
FIG. 11 is a schematic perspective view of the preferred embodiment of the cross bar type unlock-driving structure in accordance with the present invention applied to an embedded lock cartridge.
Figure 12:
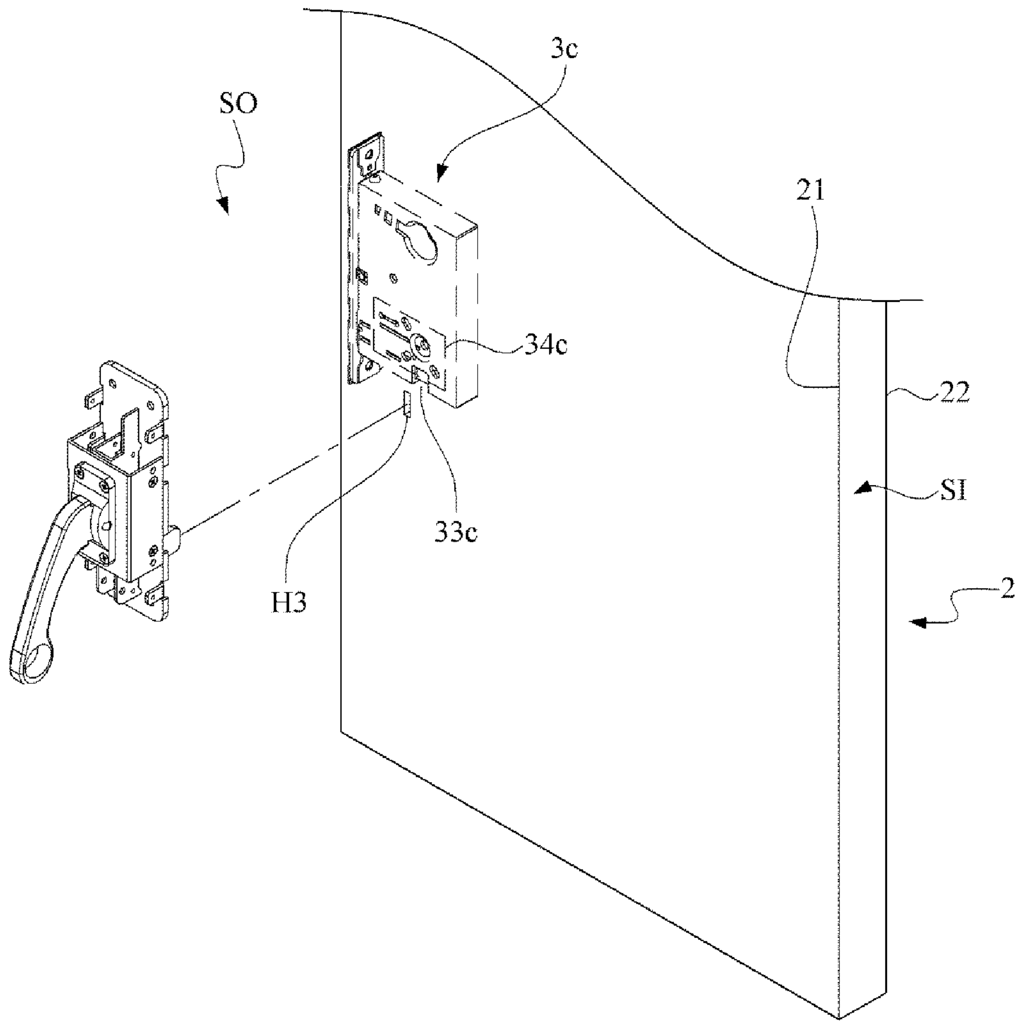
FIG. 12 demonstrates schematically the cross bar type unlock-driving structure of FIG. 11 being applied to the embedded lock cartridge mounted in a door panel.
Figure 13:
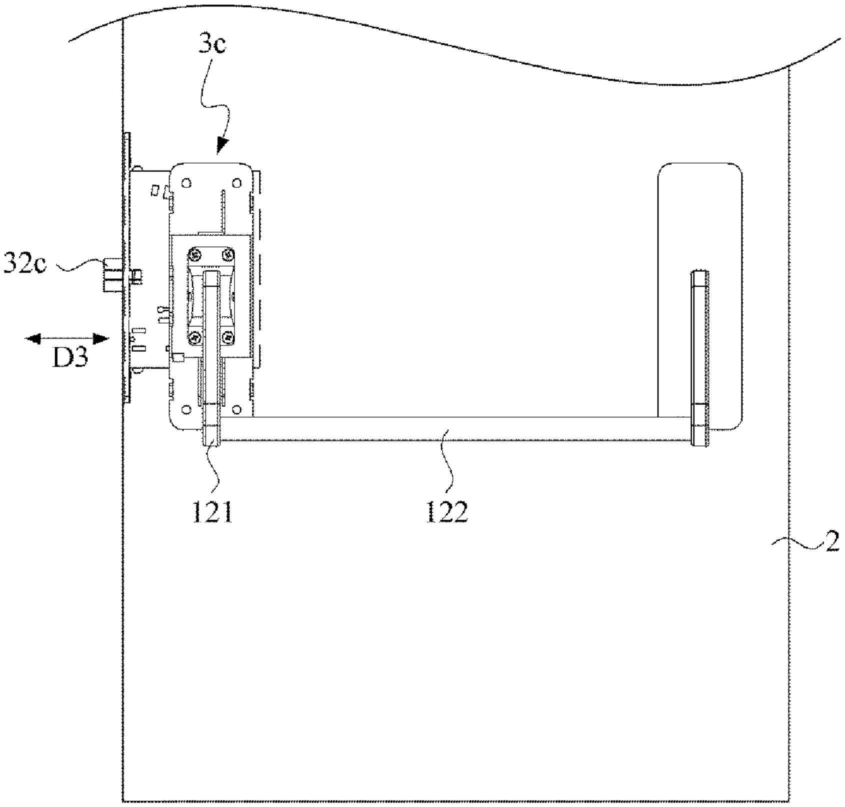
FIG. 13 is a schematic front view of FIG. 12.

Then, refer to FIG. 11 through FIG. 13; where FIG. 11 is a schematic perspective view of the preferred embodiment of the cross bar type unlock-driving structure in accordance with the present invention applied to an embedded lock cartridge, FIG. 12 demonstrates schematically the cross bar type unlock-driving structure of FIG. 11 being applied to the embedded lock cartridge mounted in a door panel, and FIG. 13 is a schematic front view of FIG. 12. As shown, the cross bar type unlock-driving structure 1 is furnished to the embedded lock cartridge 3*c* mounted in the panel-inside space SI of the door panel 2, while the cross bar type unlock-driving structure 1 is deposed in the panel-outside space SO of the door panel 2. In particular, the door panel 2 is furnished with a door panel through hole H3.

The embedded lock cartridge 3*c* includes a driven unit 31*c*, a bolt 32*c*, a striking aperture 33*c* and a turning member 34*c*. The striking aperture 33*c* is adjacent to the door panel through hole H3. The turning member 34*c*, connected with the bolt 32*c*, is also adjacent to the striking aperture 33*c*. Here, the turning member 34*c* is a common part in the art. According to this disclosure, any component that can transform a first-directional linear motion into a second-directional linear motion can be the turning member 34*c* of this embodiment. In this embodiment, the driven unit 31*c* includes at least an assembled lock lever 311*c*.

A part of the driven unit 31*c* is located within the driving stroke D1 (labeled in FIG. 8) inside the accommodation space T2 (labeled in FIG. 4). In addition, a part of the assembled lock lever 311*c* penetrates through the through hole H1 (labeled in FIG. 4), while another part thereof penetrates through the door panel through hole H3.

As the connection bar 122 is depressed down, the handle 121 would move downward as well, and thereby the driving member 13 would be driven to displace along the driving stroke D1. As the driving member 13 moves along the driving stroke D1 (labeled in FIG. 8), the driven unit 31*c* would be driven to move the assembled lock lever 311*c* toward the striking aperture 33*c* to contact the turning member 34*c*. The turning member 34*c*, pushed by the assembled lock lever 311*c*, would then retrieve the bolt 32*c*. Thereupon, the embedded lock cartridge 3*c* can be in the unlock state, and thus the door panel 2 can be pushed to open. In particular, the assembled lock lever 311*c* has a hook end for pushing the turning member 34*c*.

In this embodiment, the through hole H1 is, but not limited to, a rectangular hole. The through hole H1 can be a round hole, an oval hole, a triangular hole, a pentagonal hole or the like. One advantage of the rectangular through hole H1 is that, while the through hole is loosely penetrated by the assembled lock lever 311*c*, the area and space occupied by the rectangular through hole H1 can be substantially reduced. In addition, the rectangular through hole H1 can provide further constraints to the assembled lock lever 311*c*, such that the assembled lock lever 311*c* would move toward the turning member 34*c* correctly, such that the contact between the assembled lock lever 311*c* and the turning member 34*c* can be assured.

Figure 14:
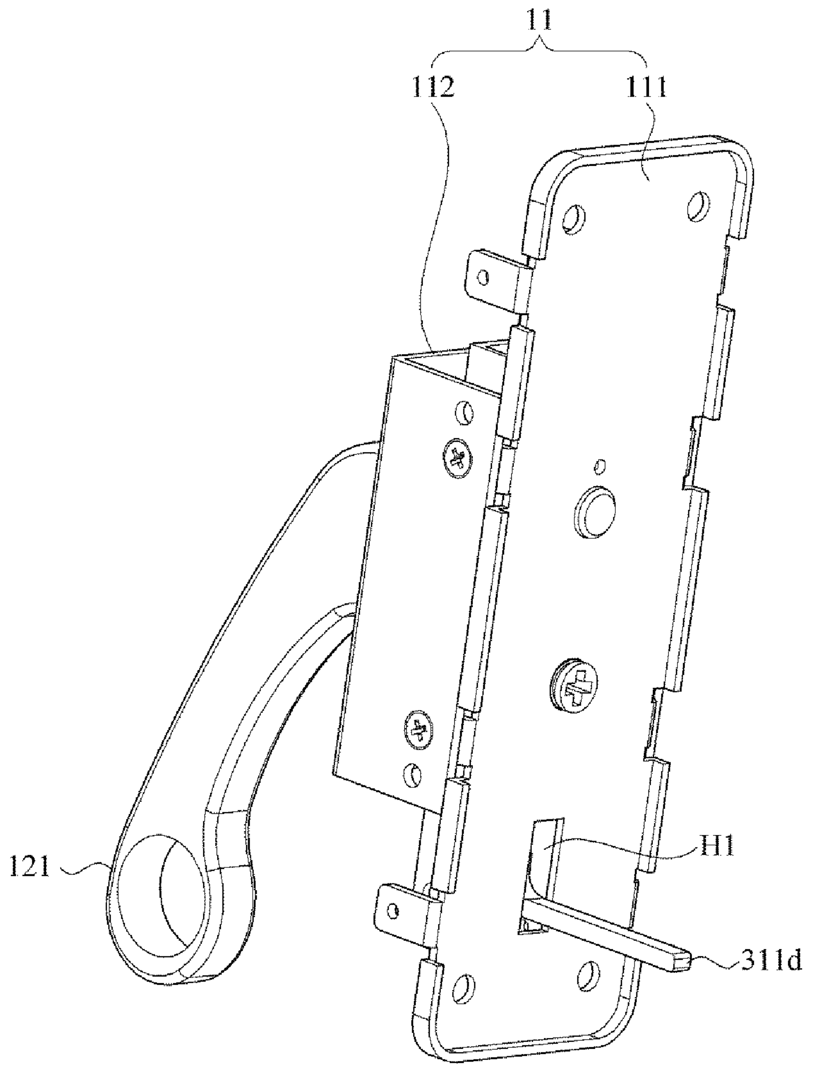
FIG. 14 is a schematic perspective view of the preferred embodiment of the cross bar type unlock-driving structure in accordance with the present invention applied to an embedded vertical double-point lock-driving structure.
Figure 15:
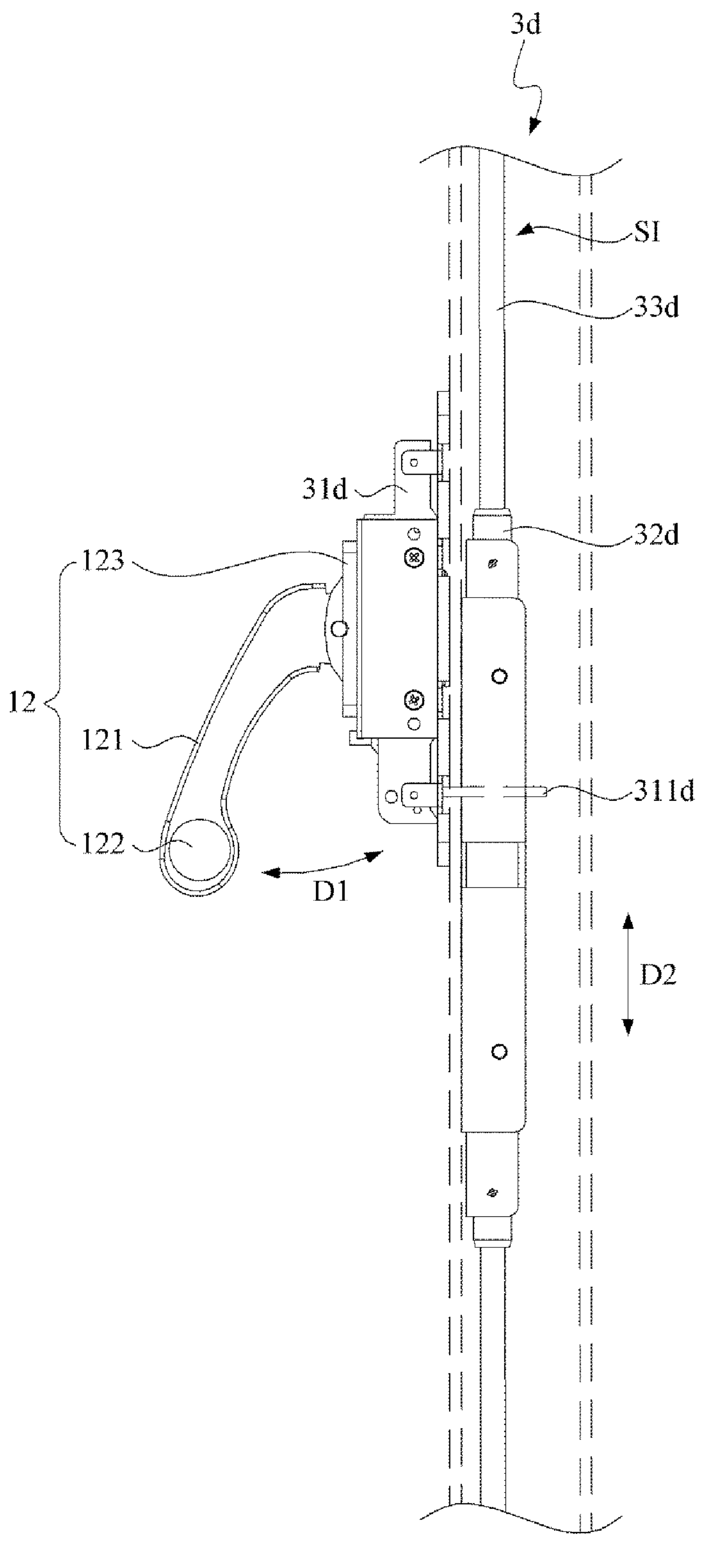
FIG. 15 is a schematic side view of the cross bar type unlock-driving structure of FIG. 14 mounted on a door panel.

Finally, refer to FIG. 14 and FIG. 15; where FIG. 14 is a schematic perspective view of the preferred embodiment of the cross bar type unlock-driving structure in accordance with the present invention applied to an embedded vertical double-point lock-driving structure, and FIG. 15 is a schematic side view of the cross bar type unlock-driving structure of IG. 14 mounted on a door panel. As shown, the cross bar type unlock-driving structure 1 (labeled in FIG. 4), furnished to the embedded vertical double-point lock-driving structure 3*d*, is mounted in the panel-outside space SO (labeled in FIG. 5) of the door panel 2, while the embedded vertical double-point lock-driving structure 3*d* is installed into the panel-inside space SI.

The embedded vertical double-point lock-driving structure 3*d* includes at least a driven unit 31*d*, an assembled connector 32*d*, and a lock bar 33*d*. The driven unit 31*d*, including an assembled lock lever 311*d*, is located within the driving stroke D1 in the accommodation space T2 (labeled in FIG. 4), in which a part of the assembled lock lever 311*d* penetrates through the through hole H1.

When the connection bar 122 is depressed down, the handle 121 is moved downward as well, such that the driving member 13 would be driven to displace along the driving stroke D1. As the driving member 13 moves along the driving stroke D1, the driven unit 31*d* would move the assembled lock lever 311*d* down, and thus the embedded vertical double-point lock-driving structure 3*d* would move upward to enter the unlock state. Then, at this time, the door panel 2 can be pushed to open.

It shall be explained that, in this disclosure, the major feature is the entire internal structure of the cross bar type unlock-driving structure 1, not the housing, and thus the housing is not sketched in all the figures. Nevertheless, practically, the cross bar type unlock-driving structure 1 does include a housing for a comfortable appearance and also for preventing from exposing the internal handle-end base 11, cross bar type handle assembly 12 and driving member 13. However, the housing will not shield completely the horizontal opening T1 and the accommodation space T2.

In summary, since the cross bar type unlock-driving structure of this disclosure is furnished with both the horizontal opening T1 and the accommodation space T2 (vertical to the horizontal opening T1) to contain variety locking/ unlocking movements of different-type of the driven units 31, 31*a*, 31*b*, 31*c*, 31*d* actuated by the pivotal movement of the driving member inside the accommodation space, thus the cross bar type unlock-driving structure 1 provided by this invention including the handle-end base 11, the cross bar type handle assembly 12 and the driving member 13 can be generally applied to the single-point lock 3, the double-point lock 3*a*, the three-point the lock 3*b*, the vertical single-point lock, the embedded lock cartridge 3*c* and the embedded vertical double-point lock-driving structure 3*d*. In comparison to the prior art whose lock or lock cartridge needs specific unlock-driving structure, the cross bar type unlock-driving structure of this invention can be directly and commonly used to fit different locks and lock cartridges. Thereupon, the relative manufacturing cost can be significantly reduced. In addition, while a replacement or maintenance of the lock is needed, the replacement process and complexity would be remarkably reduced due to the generality provided by the cross bar type unlock-driving structure of this invention, While the present invention has been particularly shown and described with reference to a preferred embodiment, it will be understood by those skilled in the art that various changes in form and detail may be without departing from the spirit and scope of the present invention.

What is claimed is:

1. A cross bar type unlock-driving structure to be mounted in a panel-outside space of a door panel and capable of being generally applied to any one of a single-point lock, a double-point lock, a three-point lock, a vertical single-point lock, an embedded lock cartridge or an embedded vertical double-point lock-driving structure, and comprising:

a handle-end base, deposed in the panel-outside space of the door panel, including:

a basic frame, mounted on the door panel, furnished at a lower portion thereof with a through hole; and a mounting frame, disposed in front of the basic frame by opposing the door panel to engage the basic frame for forming thereinside an accommodation space, having two vertical lateral plates to stand in parallel on the basic frame and a middle plate connecting the two vertical lateral plates, each of the two vertical lateral plates being structured to have a middle horizontal opening, the mounting frame being furnished at a middle portion thereof with a base through hole, wherein, as the basic frame and the mounting plate are engaged to define the accommodation space, the accommodation space is opened vertically to an upper space and a lower space and also communicated spatially with lateral spaces through the middle horizontal openings of the corresponding vertical lateral plates; and a handle and a driving member, integrated as a one-piece member, the driving member being formed as an extension finger connected to one end of the handle and connected fixedly with a connection bar, the driving member to contact a driven unit of any one of the single-point lock, the double-point lock, the three-point lock, the vertical single-point lock, the embedded lock cartridge or the embedded vertical double-point lock-driving structure in the accommodation space; and a handle seat, mounted onto the middle plate of the mounting frame by opposing the basic frame, having thereon an installation hole at a position in correspondence to the base through hole to pivotally mount the handle and the driving member with the driving member located in the accommodation space and the handle located out of the handle seat;

wherein the through hole is provided for the driven unit of any one of the embedded lock cartridge and the embedded vertical double-point lock-driving structure penetrating through.

2. The cross bar type unlock-driving structure of claim 1, wherein the mounting frame is a symmetric frame.

3. The cross bar type unlock-driving structure of claim 1, wherein a connection corner is formed between the driving member and the handle for allowing a pivotal engagement with the handle seat.

* * * * *